Nov. 21, 1950     K. E. STOBER ET AL     2,530,409
METHOD FOR POLYMERIZING STYRENE
Filed May 27, 1948     4 Sheets-Sheet 1

INVENTORS.
Kenneth E. Stober
James Lawrence Amos
BY
Griswold & Burdick
ATTORNEYS INVENTORS.
Kenneth E. Stober
James Lawrence Amos
BY
Griswold & Burdick
ATTORNEYS Nov. 21, 1950     K. E. STOBER ET AL     2,530,409
METHOD FOR POLYMERIZING STYRENE
Filed May 27, 1948     4 Sheets-Sheet 3
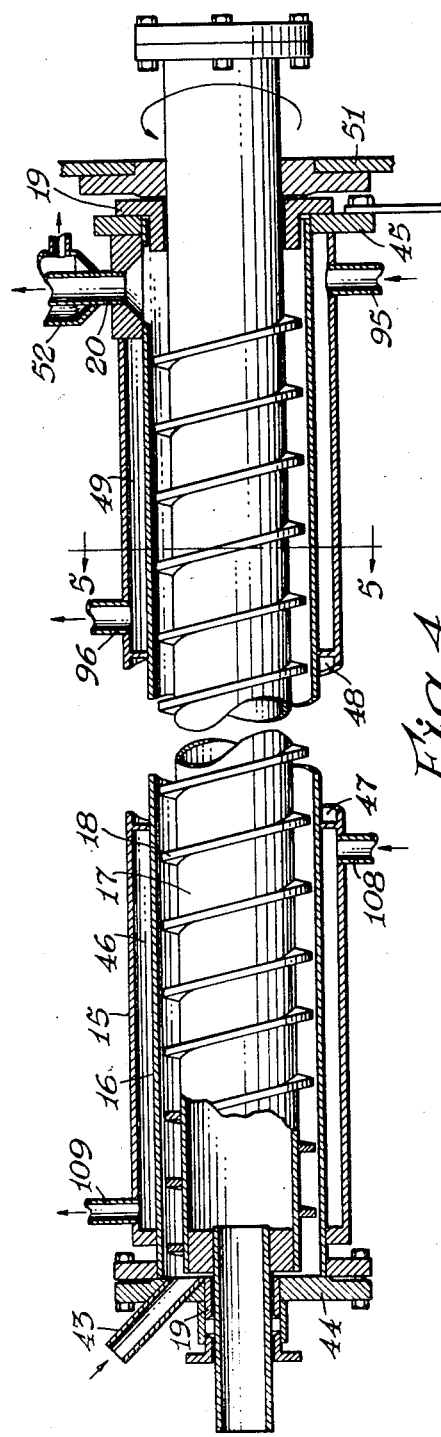
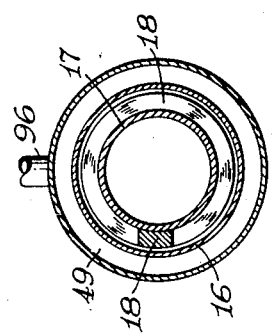
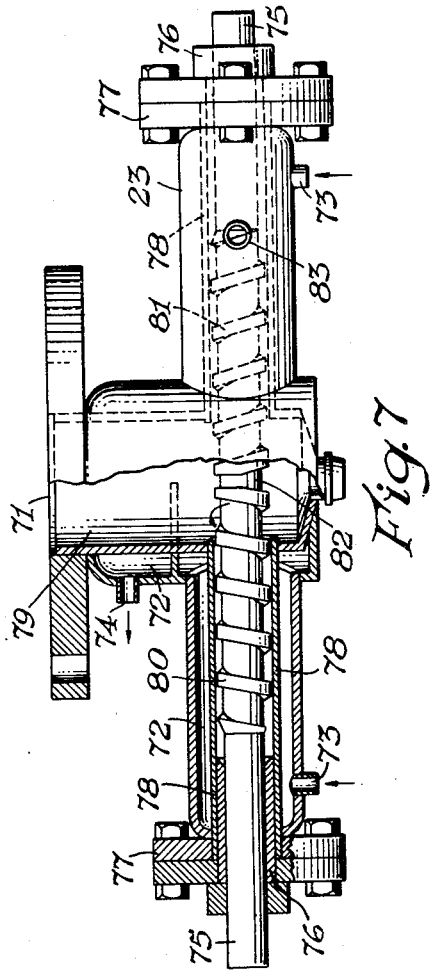
INVENTORS.
Kenneth E. Stober
James Lawrence Amos
BY
Griswold & Burdick
ATTORNEYS INVENTORS.
Kenneth E. Stober
James Lawrence Amos BY Griswold & Burdick
ATTORNEYS Patented Nov. 21, 1950

2,530,409

UNITED STATES PATENT OFFICE 2,530,409

METHOD FOR POLYMERIZING STYRENE

Kenneth E. Stober and James Lawrence Amos, Midland, Mich., assignors to The Dow Chemical Company, Midland, Mich., a corporation of Delaware Application May 27, 1948, Serial No. 29,593

1 Claim. (Cl. 260—93.5)

This invention relates to a method and apparatus for polymerizing styrene continuously to produce a uniform product of high quality.

In prior attempts at continuous mass polymerization of styrene several defects have become apparent. The most common proposal is to feed monomeric styrene slowly and continuously into a tower of large diameter and to withdraw polymer from the bottom of the tower at a corresponding and extremely slow rate, while attempting to adjust and control the temperatures at various levels in the tower to effect polymerization and to maintain the viscosity of the product at a value to permit flow. Cooling has been required in the upper levels of the tank because of the exothermic polymerization and heating has been required at the bottom to decrease the polymer viscosity. In addition to presenting a difficult problem of maintaining the desired conditions, such process has always resulted in a non-uniform product because of the tendency for the liquid monomer to flow more rapidly than the viscous polymer, from inlet to exit, along or near the heated surfaces where the mass being treated is most fluid. Such vertical mixing is highly undesirable, and results inevitably in a non-uniform product of unpredictable consistency. The products heretofore obtained from continuous polymerization of styrene in a tower, have had a high content of residual volatile matter, and, while they are capable of being molded to give sound moldings, the molded articles exhibit undesirably high power factors when exposed either to low or ultra-high frequency electrical oscillations.

When monomeric styrene is fed into and polymerized while being conveyed through a heated screw conveyor, continuous production of polymer is also possible, but the polymer product after once being cooled and solidified, is surprisingly incapable of being molded to form useful products by any standard technic. When it is attempted to mold granules of the product, the resulting article is extremely brittle, it exhibits extreme dimensional distortion due to shrinkage during molding, and often cannot be removed intact from the mold.

The above-mentioned and other disadvantages of the processes heretofore proposed for the continuous mass polymerization of styrene make desirable the provision of a method whereby such disadvantages may be avoided or overcome, and an apparatus in which the method may be carried out. Accordingly, it is the principal object of the present invention to provide a method for the continuous polymerization of styrene at a practical rate of production, to produce a uniform polymer with a low content of residual volatile matter, which polymer is capable of being molded to form dimensionally stable, sound moldings with good electrical properties when exposed to low, intermediate and ultra-high frequency oscillations. A related object is to provide an apparatus susceptible of the required accuracy of control and quick response to control, capable of converting monomeric styrene continuously to polystyrene as aforesaid. Particular objects are to provide specific parts of and controls for the desired apparatus. A specific object is the provision of a method comprising controlled and continuous prepolymerization of styrene without vertical mixing, controlled progressive polymerization of the partial polymer in a horizontal screw conveyor to form a useful polymer with little residual volatile matter, continuous devolatilization of this polymer, and continuous extrusion of the finished polymer to a cooling zone where it is or may be cut into useful molding granules. A related specific object is the provision of a new and useful combination of apparatus for carrying out the prepolymerization, the final polymerization, the devolatilization and extrusion in a fully controlled manner to produce the desired consistent and useful product. Other and related objects may appear as the description of the invention proceeds.

The method of the invention, and the apparatus in which the new process is carried out, will be described with reference to the accompanying drawings, wherein, Fig. 1 is a flow sheet for the process, showing the principal major elements of the apparatus;

Fig. 4 is a longitudinal view, partially in section, of the continuous polymerization apparatus;

Fig. 5 is a vertical cross-section through the polymerization apparatus, taken along the line 5—5 of Fig. 4;

Figure 1:
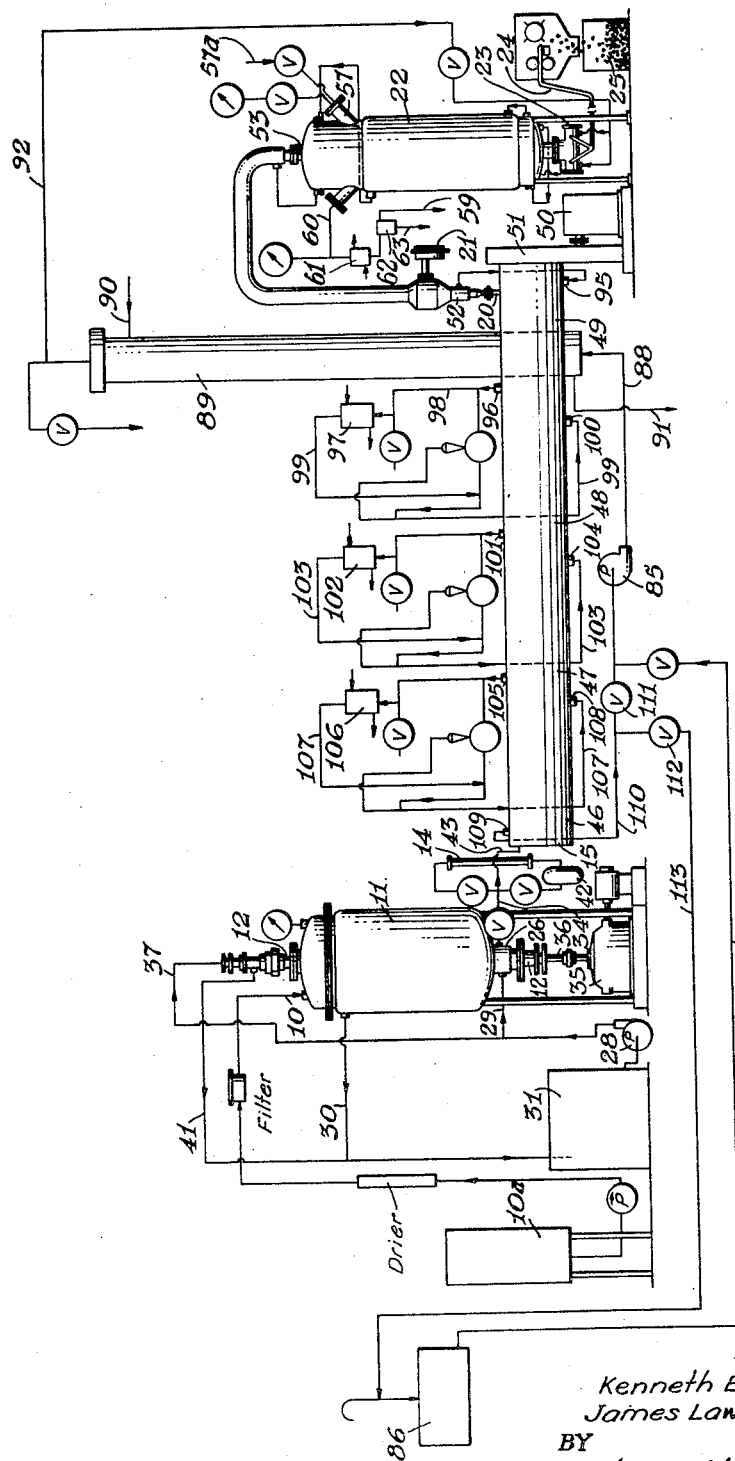

The method of the present invention comprises the continuous introduction of clean, dry styrene monomer through line 10 from storage 10a to the top of a body of liquid monomer and partial polymer in a vertical prepolymerization vessel 11 to be described more fully hereinafter, at a rate to keep the vessel full of liquid, or to maintain a constant liquid level therein. If any space remains over the liquid in the prepolymerizer, it should be free from air and oxygen, but may be filled with styrene vapor or with an inert gas such as nitrogen, methane, carbon dioxide, or the like. Preferably, however, the prepolymerization vessel 11 is kept full of styrene and free from any gas except such trifling amount as may be dissolved in the incoming monomer. It is preferred, further, to operate the prepolymerization vessel with the contained liquid under a small positive pressure to prevent contamination of the monomer and resulting polymer with lubricant or other material which might be extracted from stuffing glands 12, located about the vessel. The polymerization temperature of the liquid is kept constant in the prepolymerization vessel, suitably at or near 95° C., by withdrawing heat from, or supplying it to, the liquid body both through the walls of the vessel and within the body of the liquid by means of a special non-agitating sweep 13 to be further described later. The said sweep 13 is so constructed as to cut through the liquid at a constant low rate of rotation to effect temperature equalization therein without causing any vertical mixing of liquid from the upper levels with that which has progressed with the passage of time to a lower level. The rate of passage of styrene through the prepolymerization vessel 11 is adjusted to effect a fixed amount of polymerization between 20 and 50 per cent of that which is theoretically possible.

Upon leaving the prepolymerizer 11 by gravity flow or under slight applied pressure, a portion of the hot liquid partial polymer is constantly checked for uniformity by passing through a continuous recording viscosimeter 14, and thence to the polymerization vessel 15. Any change in viscosity calls for an opposing change in the temperature conditions in the prepolymerizer 11. Thus, a decrease in viscosity of partial polymer is corrected by increasing the temperature, and hence the rate and extent of polymerization in the prepolymerization vessel 11. Because of the large mass of material therein relative to that withdrawn at any instant, the required temperature adjustment is very small, and settled conditions are evidenced by almost complete freedom from viscosity changes.

After being checked for viscosity, the partial polymer passes to the cylindrical barrel 16, of a screw conveyor polymerization vessel 15 of special design, where its temperature is increased at once to about 120° C. The polymerizing mass, still liquid, is forwarded primarily by the constant introduction of additional partial polymer made possible by the corresponding discharge of high polymer from the far end of the screw conveyor 15. The screw 17, centered in the cylindrical barrel 16, is of constant pitch and of such size that there is considerable clearance, of the order of 0.125 to 0.5 inch between the land of each flight 18 and the adjacent cylindrical barrel 16. As a result, the slowly rotating screw 17 serves primarily as a local homogenizer for the partial polymer being treated, bringing the latter frequently into heat-exchange contact with the jacketed cylindrical barrel 16, and maintaining the mass in each portion of the conveyor at the temperature of the fluid in the jacket about that portion of the barrel 16 without mixing material at a low stage of polymerization with that at a more advanced stage. There are, in progression along the barrel 16 of the conveyor 15, four separately jacketed sections, each at a higher temperature than the preceding section and each having its individual supply of heat transfer fluid. Thus, the four sections may be heated to such successive temperatures as 120°, 130°, 150° and 180° C., respectively, in the direction of movement of the polymerizing material therethrough. Hence, as the polymerization proceeds, the polymer is kept mobile by increases in temperature which overcome the progressively increasing viscosity which would be observed at constant temperature. Pressure is maintained on the polymer by the slight forwarding effect of the screw 17, and a small but continuous amount of polymer is forced out around the bearings 19 on which the screw rotates, serving as the bearing lubricant and preventing contamination of the main body of polymer product. The latter is discharged from the conveyor 15 through a heated conduit 20 in which is housed the detecting mechanism of a recording viscosimeter 21. Changes in viscosity of the polymer again call for opposing changes in temperature conditions along the barrel of the polymerization screw, and uniformity of the product is maintained. From the conduit 20, the polymer is continuously discharged to a suitable devolatilizer 22, where the already low volatile content is removed by evaporation thereof from fine streams of the hot polymer falling through space under a reduced pressure of the order of 4 millimeters of mercury, absolute pressure. After such treatment, the polymer is gathered in a pool at the bottom of the devolatilizer 22, while still hot, and is extruded or pumped therefrom through a vacuum-tight extruder, valve or pump 23. The discharged polymer is cooled below the solidus point, commonly as a thin strip 24, and may be cut into particles 25 of a size suitable as feed for molding operations.

Figure 3:
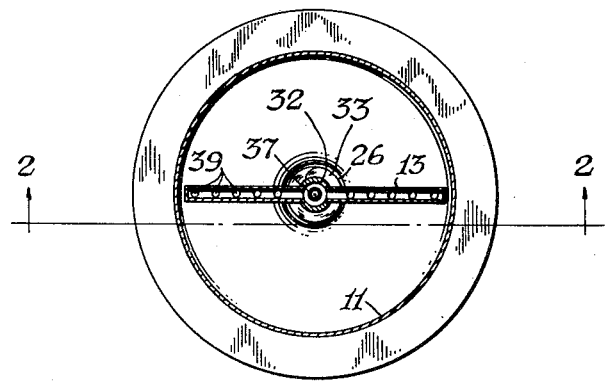
Fig. 3 is a horizontal cross-section through the prepolymerization vessel, taken along line 3—3 of Fig. 2.
Figure 2:
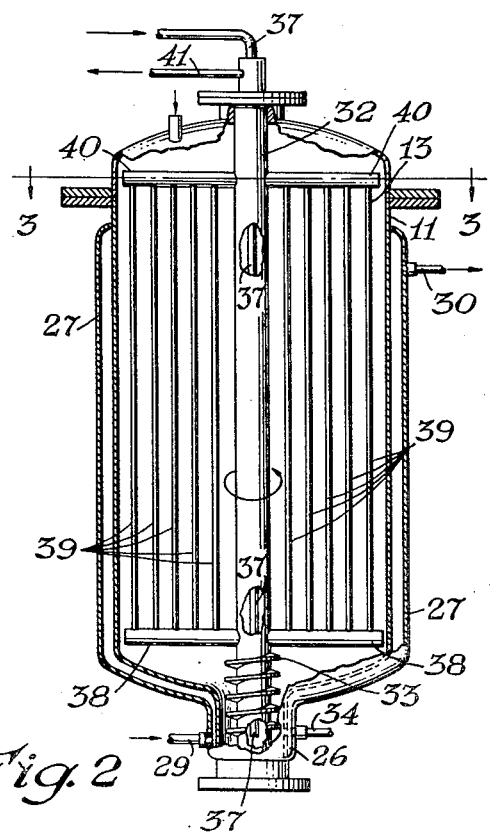
Fig. 2 is a vertical section through the prepolymerization vessel, taken along line 2—2 of Fig. 3.

The prepolymerization vessel 11, to which styrene monomer 10 is fed continuously from storage 10a through a pump, drier and filter, is illustrated in Figs. 1, 2 and 3. In the illustrated and preferred embodiment, vessel 11 is a vertical cylindrical closed tank with a sump 26 in the center of its lower end. Surrounding the side and bottom walls of tank 11 and sump 26 is a jacket 27 to which water or other heat transfer fluid is supplied by pump 28 through pipe 29, and from which the coolant is exhausted through pipe 30 and is returned to a storage reservoir 31. Within and coaxial with prepolymerization tank 11 is mounted a special non-agitating sweep 13 having about the lower end of its central hollow shaft 32 a helical impeller 33 to displace viscous partial polymer from sump 26 through outlet pipe 34. Sweep 13 and attached screw impeller 33 are mounted vertically over a motor-driven gear reducer 35 and are rotated at a constant slow rate by shaft 36 which enters sump 26 through lower stuffing gland 12. Water or other coolant from reservoir 31 enters hollow sweep 13 through stationary pipe 37 which extends coaxially with and nearly to the bottom of hollow shaft 32. From shaft 32 the coolant flows out through horizontal header 38, rises from thence through plural parallel risers 39, reenters shaft 32 through upper horizontal header 40, and leaves the vessel to return through pipe 41 to reservoir 31. Sweep 13, then, comprises hollow central shaft 32 about the axis of rotation, having lower and upper hollow header pipes 38 and 40 extending symmetrically therefrom nearly to the vertical cylindrical wall of vessel 11, and connected by a plurality of evenly spaced parallel pipes 39. The configuration and disposition of sweep 13 assures uniform temperature conditions from top to bottom of vessel 11, and the spacing of pipes 39 permits this rotary member to sweep slowly through the liquid-filled vessel without causing agitation or vertical mixing of the polymerizing liquid. It should be understood that sweep 13 might have three or four radially disposed cooling members rather than the two illustrated, and that the vessel 11 might be of such shape, in cross-section, as to permit installation of two such sweeps 13, rather than the illustrated cylindrical vessel and single sweep.

The continuous recording viscosimeter 14, interposed between the prepolymerization vessel 11 and the continuous screw polymerizer 15, receives partial polymer from pipe 34 and circulating pump 42, and returns the measured material to pipe 34 for feed to the continuous polymerization vessel 15, which it enters through pipe 43 (Fig. 4). The measuring tube of viscosimeter 14 contains another, closed tube which rises to the top of tube 14 while pump 42 is operating, and falls through the viscous liquid when the pump stops at frequent and regular intervals. The time of fall of the internal tube is determined electrically, and is a measure of the viscosity of the liquid in tube 14.

The continuous polymerization vessel 15 is a long straight horizontal tube 16 serving as the barrel for a screw 17 of constant pitch, extending the length of barrel 16 through loose fitting bearings 19 centered in heads 44, 45 of said barrel 16. The land radius of screw 17 is less, by from 0.125 to 0.5 inch, than the radius of barrel 16, leaving a clearance between the screw 17 and its barrel 16 so that screw 17 has a displacement efficiency less than 10 per cent. The long cylindrical barrel 16 is surrounded by four approximately equal jacket sections 46, 47, 48 and 49. Jacket 49, the last in the series along barrel 16, is traversed by polymer outlet conduit 20, which opens into barrel 16 at the opposite end from inlet 43. Each jacket section has an inlet and an outlet for heat transfer fluid, and the flow of such fluid, as well as the control of its temperature in each jacket section will be described later. Screw 17 is rotatable at a constant slow rate, provision being made to drive it by motor 50 through gears 51 (not shown in detail).

Outlet conduit 20, enclosed in a jacket 52 for heat transfer fluid, houses the detecting mechanism (not shown) of a rotary viscosimeter 21 of the recording type, and connects the screw polymerizer 15 with the devolatilizing kettle 22. Owing to the highly viscous character of the polymer which passes viscosimeter 21, this instrument is of a different type than viscosimeter 14, which operates on more fluid mixtures. Viscosimeter 21 measures the time required to rotate a paddle under fixed load through the viscous polymer at a given temperature. The paddle is in the direct path of polymer in conduit 20.

Figure 6:
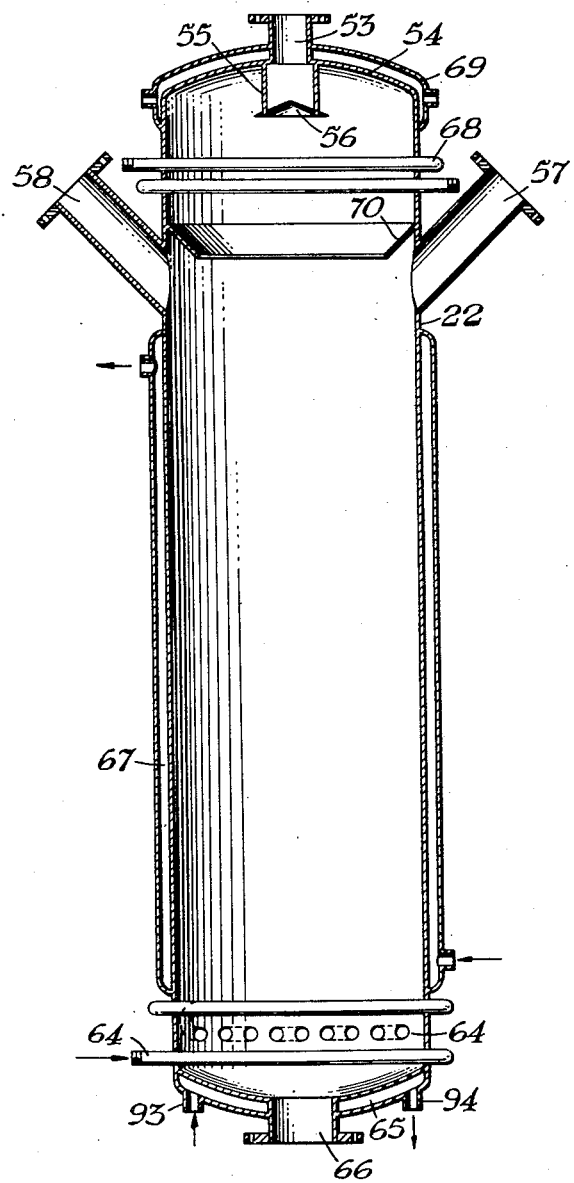
Fig. 6 is a vertical section through the finishing, or devolatilization kettle; and, Fig. 7 is an elevation, half in vertical section, of a preferred type of polymer discharge pump.

Finishing kettle 22 is a vertically mounted cylindrical vessel having a polymer inlet 53 in the center of its upper head 54 (Fig. 6). Inlet 53 is in direct communication with a polymer receiving cup 55, the bottom of which is a multiple orifice plate 56, through which molten polymer may fall in fine streams to the bottom of kettle 22. In the upper third of cylindrical kettle 22 are two open arms, one to provide an inlet 57 for inert gas which may be introduced through pipe 57a and used to devolatilize the polymer streams, and the other to provide an outlet 58 for such gas and entrained monomeric styrene or, alternatively, to serve as the connection to a vacuum line 59 for withdrawing volatile matter. Outlet 58 communicates through line 60 with condenser 61 and trap 62 from which styrene monomer may be recovered through pipe 63. The bottom portion of kettle 22 contains heating coil 64 which serves to keep molten the polymer devolatilized in said kettle. Heating jacket 65 covers the bottom of kettle 22, and surrounds a polymer drainage outlet 66. The main body of kettle 22 is surrounded by heating jacket 67 and the top portion is heated by heating coil 68 and top jacket 69. To prevent the accidental deflection of the falling polymer streams into outlet 58, a truncated conical baffle 70 is mounted in the cylindrical wall of kettle 22 just above that outlet.

Polymer drainage outlet 66 opens directly into mouth 71 of a vacuum-tight product pump 23 (Figs. 1 and 7) which is completely enclosed in heat jacket 72 provided with inlets 73 and outlet 74 for heat transfer fluid. Pump 23 has a single moving part constituting a rotary shaft 75 driven by means not shown and mounted in loose-fitting bearings 76 centered in and extending externally of heads 77 at each end of elongated horizontal rotor housings 78 which are disposed as extensions of each end of a diametrical line through the vertical receiving chamber 79 of pump 23. Rotary shaft 75 has dual screw flights 80 and 81 of opposite hand, each extending laterally from the center 82 of shaft 75 into the rotor housings 78 so that, when shaft 75 is rotated in the direction shown, rotor 75 is adapted to feed molten polymer from receiving chamber 79 in each direction through housings 78 to outlet ports 83 which project through jacket 72 of pump 23. Any streams 24 of molten polymer may be received on a conveyor belt or other suitable carrier, not shown, and delivered, when cooled beneath the solidus point, to any suitable cutter 84 capable of severing the continuous strips of polymer into small particles 25 suitable for use as molding granules.

Temperature of the exothermic polymerization reaction in prepolymerization vessel 11 is controlled, as already described, by circulation of water or other heat transfer fluid from reservoir 31. The various temperatures required in the continuous polymerizer 15, conduit 20, devolatilization kettle 22 and product pump 23 are attained from a single supply of a heat transfer fluid in a manner which will now be described with reference to Fig. 1. A suitable fluid for the purpose is the eutectic mixture of about 73.5 per cent diphenyloxide, and 26.5 per cent diphenyl. The fluid to be used is drawn by pump 85 from a supply tank 86 through pipe 87, as needed, and is fed through pipe 88 to any suitable heat exchange apparatus 89 where the fluid is heated through tube walls (not shown) by steam admitted to exchanger 89 under pressure through pipe 90 and exhausted through pipe 91. The so-heated fluid is forwarded through pipe 92 to inlets 73 in the jacket of pump 23, and from thence, through outlet 74 and into the bottom jacket 66 of kettle 22, entering at inlet 93 and leaving through outlet 94. Through suitable pipe connections shown diagrammatically in Fig. 1, the hot fluid enters pipe coil 64 and passes through jacket 67, coil 68 and upper jacket 69 about kettle 22, leaving jacket 69 to pass through jacket 52 about conduit 20. From jacket 52, the fluid is piped into the jacket of section 49 of the polymerization vessel 15, entering through inlet 95 and leaving through outlet 96. Thus, section 49, conduit 20, kettle 22 and pump 23 may all be kept at practically the same temperature, which is high enough to keep polystyrene molten, though another heat exchanger (not shown) may be installed to cool the heat exchange fluid from kettle 22 to a lower temperature before it enters section 49. The heat transfer fluid leaving section 49 enters a heat exchanger 97 through pipe 98 and is cooled slightly, by means of a second fluid such as water or low pressure steam, the flow of which is shown diagrammatically. From exchanger 97, the hot fluid flows through pipe 99 to inlet 100 of section 48, and leaves that jacket through outlet 101 to enter heat exchanger 102 where it is cooled in similar manner to the temperature desired in jacket section 47. It then flows, in succession, through pipe 103, inlet 104, jacket section 47, outlet 105, heat exchanger 106, pipe 107, inlet 108, jacket section 46, outlet 109, and pipe 110 from which it may be recirculated by pump 85 and reheated in exchanger 89, or it may be diverted by suitable regulation of valves 111 and 112 through pipe 113 to storage tank 86.

The following example illustrates the practice of the invention:

The apparatus employed was then illustrated in the drawings, in which the prepolymerization vessel 10 had a capacity of about 1800 pounds and had internal dimensions of 3 feet in diameter by 6 feet in height above sump 26. Sweep 13 had 10 vertical pipes 39 spaced 3 inches on centers, connected by 2-inch headers 38 and 40 and were fed from 4-inch pipe 32. The continuous screw polymerizer was 16 feet long, with four 4-foot jacketed sections, connected as described with the source of heat transfer fluid (the diphenyloxide-diphenyl eutectic). The rotary screw had a root diameter of 6 inches, the screw flight had a 4-inch pitch and a land diameter of 9 inches, and was centered in a barrel 16 whose inside diameter was 10 inches, leaving 0.5 inch clearance between the screw lands and the barrel and an available cross-sectional area of about 50 square inches for handling polymerizing fluid. The devolatilization kettle 22 was 8 feet high from inlet 53 to outlet 66 and had an inside diameter of 2 feet in its cylindrical body. Pump 23 had a 4-inch inlet 71 and a rotor 75 about 30 inches long and with 2-inch land diameter. The dual screw portions were each about 8 inches long and the outlets 83 were 0.75 inch in diameter.

Monomeric styrene was fed at a rate of 20 pounds per hour to the prepolymerizer 10 which was kept full of the polymerizing liquid at 92° C. This temperature was maintained by circulating water at 90° C. through the jacket 27 and sweep 13 while the latter was rotated at 30 revolutions per minute. The average residence time of the liquid in the prepolymerizer was 90 hours, and the partial polymer discharged therefrom had a "solids" or non-volatile content of 35 per cent by weight. The screw 17 in polymerization vessel 15 was driven at a constant speed of 1 revolution per minute and was heated in its successive sections along the path of flow to temperatures of 120°, 120°, 140° and 200° C., respectively. The average residence time in the screw polymerizer was about 18 hours. When discharged from the screw polymerizer to the devolatilization kettle, the polystyrene contained from 4.5 to 5 per cent by weight of volatile material, most of which was monomeric styrene and the balance of which was principally dimeric and trimeric styrene. Devolatilization kettle 22 was kept at 255° C. and under an absolute pressure of 4 millimeters mercury to devolatilize the fine streams of polystyrene falling therethrough. The polymer product was extruded through pump 23 at 255° C. at a rate of about 19 pounds per hour and was promptly cooled and cut into small pieces suitable for molding. The polymer had a residual volatile content of 0.2 per cent. A 10 per cent solution of the polymer in toluene at 25° C. had a viscosity of 49.3 centipoises. Moldings made from the polymer had tensile strengths of 8410 pounds per square inch, impact strengths of 1.3 inch pounds per inch of notch, and a heat distortion temperature of 94° C. The latter value is from 6 to 12 degrees higher than similarly measured values on commercially available polystyrene made by either of the well-known commercial processes. Small cups, molded at 260° C. were prepared from the polymer of the present process as well as from representative commercial polystyrene samples. Some of these cups were immersed in water at 88° C. and others were so immersed at 100° C. Those made from the polymer of this process showed no distortion after immersion at 88° C. for 10 minutes, and very little distortion at 100° C. after 5 minutes. By way of contrast, the cups made from commercial polymer were noticeably distorted at 88° C. in 10 minutes and were badly distorted when immersed at 100° C. for 1 minute. The polymer produced by the new process showed marked improvement over each of several representative commercial polymers in its electrical insulating properties at high frequencies, as is evidenced by the following data showing the per cent power factor of moldings of the polymers at each of several frequencies:

| Frequency, Cycles/Second | Per Cent Power Factor of— | | | | |
|---|---|---|---|---|---|
| | New Polymer | Standard Polymers | | | |
| | | (1) | (2) | (3) | (4) |
| 100 | .007 | .008 | .01 | .0065 | .009 |
| 1,000 | .0037 | .008 | .0163 | .0065 | .009 |
| 10,000 | .0037 | .008 | .01 | .0065 | .022 |
| 100,000 | .0092 | .008 | .007 | .0130 | .0134 |
| 1,000,000 | .0141 | .0257 | .0173 | .0177 | .034 |
| 10,000,000 | .0306 | .0496 | .0354 | .0350 | .082 |
| 100,000,000 | .0166 | .031 | .028 | .029 | .0625 |

It is noted that the polymer produced by the new process has at least as low power factor as any of the commercial polymers in the low frequency range, and that it has much lower per cent power factor when tested under high and ultra-high frequencies. When the above data are plotted, it is noted that all curves climb to maximum power factor values at $10^7$ cycles, and then fall off, and that the value measured at $10^8$ cycles for the new sample is from ½ to ¼ that found for the other samples.

The invention has been illustrated and described with respect to the polymerization of styrene, but the method and apparatus may be employed as well in the polymerization of those homologs of styrene which form thermoplastic polymers, and in the copolymerization of styrene with such homologs, as for example alpha-methyl styrene.

We claim:

The method which comprises adding monomeric styrene at a constant rate to the top of a body of styrene maintained throughout its mass at a constant and uniform polymerization temperature between 80° and 110° C. under conditions to minimize vertical mixing of styrene in various stages of polymerization, continuously withdrawing partially polymerized styrene from the bottom of said mass at the same constant rate which is so chosen that, at the prevailing temperature, the styrene withdrawn has polymerized to a constant value between 20 and 50 per cent of the extent theoretically possible and has a substantially constant viscosity, continuously introducing the so-withdrawn partial polymer into an elongated horizontal cylindrical polymerization zone, continuously mixing the polymerizing material in the zone with other such material therein having attained a similar degree of polymerization while advancing the polymerizing material through the zone and exposing it to progressively higher temperatures to maintain at all stages of polymerization therein a fluid consistency in the polymer, continuously withdrawing the substantially fully polymerized fluid styrene from the polymerization zone, dividing the polymer while still fluid into fine streams in an inert atmosphere to expose a large surface relative to the mass thereof and to remove substantially all of the remaining volatile matter from the polystyrene, and continuously discharging the devolatilized polystyrene from the devolatilization zone without admitting air to said zone.

KENNETH E. STOBER.
JAMES LAWRENCE AMOS.

REFERENCES CITED

The following references are of record in the file of this patent:

UNITED STATES PATENTS

| Number | Name | Date |
|---|---|---|
| 2,240,618 | Harris | May 6, 1941 |
| 2,270,182 | Collings | Jan. 13, 1942 |
| 2,391,393 | Coffman | Dec. 25, 1942 |
| 2,418,797 | Voorhees | Apr. 8, 1947 |

FOREIGN PATENTS

| Number | Country | Date |
|---|---|---|
| 475,635 | Great Britain | Nov. 23, 1937 |
| 596,377 | Great Britain | Jan. 2, 1948 |

OTHER REFERENCES

DeBell et al. German Plastics Practice (pp. 26–31) (1946).